Patented Nov. 3, 1931

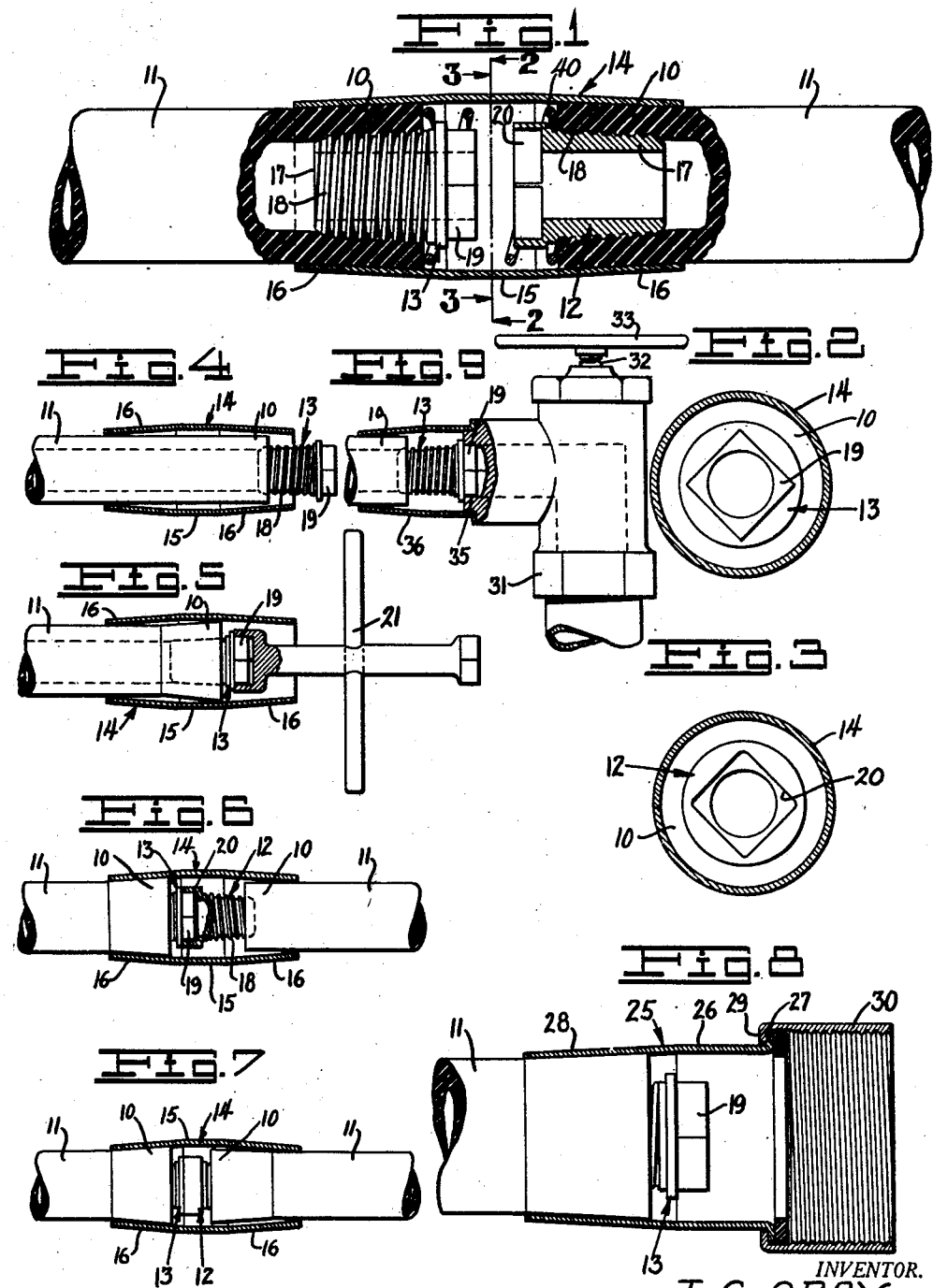

1,830,229

UNITED STATES PATENT OFFICE

THEODORE C. GRAY, OF SAN PEDRO, CALIFORNIA

HOSE COUPLING DEVICE

Application filed December 8, 1928. Serial No. 324,651.

This invention relates to coupling devices for hose pipes.

The general object of the invention is to provide an improved hose coupling which is simple, effective and which provides a fluid tight seal.

Another object of the invention is to provide a hose coupling including members fitting within adjacent portions of hose and a single member which engages the exterior of the adjacent ends of the hose.

Another object is to provide a hose coupling including threaded members fitting the inner end portions of the hose and an external member engaging the external end portions of the hose.

A further object of the invention is to provide a hose coupling including an outer sleeve engaging the ends of the hose and inner members forcing the outer surface of the hose against the connecting member.

Other objects of the invention and the advantages thereof will be apparent from the following description taken in connection with the accompanying drawings wherein:

Fig. 1 is a sectional view showing the end portions of two pieces of hose connected by my improved coupling.

Fig. 2 is a section on line 2—2 of Fig. 1.

Fig. 3 is a section on line 3—3 of Fig. 1.

Fig. 4 is a side elevation partly in section showing an internal coupling element being inserted.

Fig. 5 is a view similar to Fig. 4 showing the manner in which the internal coupling member is moved to position.

Fig. 6 is a similar view showing the second internal coupling member engaging the first and with the hose beginning its engagement with the second coupling member.

Fig. 7 shows the coupling member in position and with the hose ends ready to be separated to make the seal tight.

Fig. 8 is a sectional view partly in elevation showing my invention employed in connection with a rotatable screw coupling, and Fig. 9 is a sectional view of my invention in use with a hydrant valve.

Referring to the drawings by reference characters I have shown my invention in connection with the ends 10 of hose lengths 11 which may comprise hose of any character.

My invention as shown comprises a pair of inner coupling elements 12 and 13 and an outer collar 14. The collar 14 as shown, includes a central cylindrical portion 15 and portions 16 which are tapered within and without on a taper to suit the particular needs of the hose for which the collar is adapted. The collar may be made of any suitable metal, fiber or other material and may be of any diameter or length.

The coupling elements each include a body portion 17 which has a central bore therethrough. The outer portion of the body portion is tapered and is provided with threads as at 18. These threads 18 may be of any suitable configuration and although they are shown in the drawings as square threads the character of the threads may be changed depending on the hardness of the hose and on other conditions.

The coupling members are provided with wrench engaging portions 19 and 20 respectively. These portions are shaped so they will fit one within the other thereby allowing the coupling elements to be turned.

In use the coupling collar is fitted over the end of one piece of hose as shown in Fig. 4. The coupling element 13 is then inserted in the end of the hose and the collar moved so that the coupling element is within the cylindrical portion 15 of the collar as shown in Fig. 5. Then by means of a wrench shown at 21 (or by other means) the coupling element 13 is screwed home, after which the end of the hose 11 is moved within the collar so that the expanded portion thereof engages the tapered end 16 of the collar.

The companion coupling element 12 is then fitted in the end of the other hose length 11 and inserted in the collar so that the wrench engaging portion 19 fits the wrench engaging portion 20. The hose ends are then given relative rotation causing the end 11 which engages the element 12 to thread upon the coupling element 12 and thereby to expand the end of the hose 11.

After this is done the hose ends are pulled apart causing the collar to tightly grip the adjacent portions of the hose to provide a fluid tight joint.

In Fig. 8 I have shown a slightly modified form of my invention wherein the hose end 11 is provided with a coupling element 13 which is positioned to expand the end of the hose 11 which receives a collar 25 including a cylindrical portion 26 having a flange 27 thereon and also including a tapered portion 28 which fits the taper on the end of the hose 11 to make a fluid tight joint. The flange 27 engages a flange 29 on a rotatable coupling member 30, the use of which will be readily apparent.

In Fig. 9 I show my invention in connection with a specially designed hydrant 31 which includes the usual valve stem 32 having a hand wheel 33 thereon. The exit port of the valve is provided with a rectangular aperture 35 to receive the tool engaging portion 19 of the member 13. A collar 36 is secured to the hydrant as by welding or may be made an integral part of the hydrant if desired. The member 13 is placed on the end of the hose and is moved inwardly through the collar 36 so that the wrench engaging portion 19 is positioned in the recess 35. The hose is then turned causing the member 13 to be screwed home thereby expanding the end of the hose, after which the hose is pulled outward so that the expanded portion engages the tapered portion of the collar 36.

With my invention the greater the pressure the greater the seal, however, when my device is used in a system having a low pressure fluid and particularly in gas systems I may provide a spring 40 which is interposed between the adjacent ends of the hose in the collar as shown in Fig. 1. This spring is adapted to force the expanded ends of the hose into fluid tight engagement with the taper on the collar after the expanding fittings are in position.

Similarly functioning springs may also be provided in the device shown in Figs. 8 and 9 if desired.

From the foregoing description it will be apparent that I have provided a novel hose coupling which is simple in construction and highly efficient in use.

Having thus described my invention, I claim:

1. In combination with a pair of adjacent hose ends, a coupling member, said coupling member including a collar having tapered end portions each engaging said hose ends, the central portion of said collar being cylindrical and means within said hose ends to force said hose ends outwardly against said collar, and other means within said collar and adapted to resiliently urge said hose ends apart.

2. In combination with a pair of adjacent hose ends, a coupling member including a collar having tapered end portions each engaging said hose ends, the central portion of said collar being cylindrical and means within said hose ends to force said hose ends outwardly against said collar, said means comprising hollow coupling elements, each of said elements having a threaded outer surface, said threaded outer surface being tapered from one end towards the other and said coupling elements having interengaging portions thereon whereby one may be turned by the other, and resilient means positioned in said collar, surrounding said coupling elements and engaging the end faces of said hose ends and adapted to resiliently urge said hose ends into engagement with the said tapered ends of said collar.

3. In combination with a pair of adjacent hose ends, a coupling member, including a collar having tapered end portions each engaging said hose ends, the inner surfaces of said tapered end portions being smooth, means within said hose ends to force said hose ends outwardly against the smooth portion of said collar, said means comprising hollow coupling elements, each of said elements having a threaded outer surface, said threaded outer surface being tapered from one end towards the other and said coupling elements having readily releasable interengaging portions thereon whereby one may be turned by the other.

In testimony whereof, I hereunto affix my signature.

THEODORE C. GRAY.